United States Patent
Lester et al.

(10) Patent No.: US 10,224,870 B2
(45) Date of Patent: Mar. 5, 2019

(54) BRACKET MOUNTING ASSEMBLY FOR SECURING JUNCTION BOXES TO SOLAR PANEL ARRAYS

(71) Applicant: Ironridge, Inc., Hayward, CA (US)

(72) Inventors: Bryan Lester, Phoenix, AZ (US); William Pereira, Phoenix, AZ (US); Shawn Meine, Phoenix, AZ (US)

(73) Assignee: Ironridge, Inc., Hayward, CA (US)

( * ) Notice: Subject to any disclaimer, the term of this patent is extended or adjusted under 35 U.S.C. 154(b) by 0 days.

(21) Appl. No.: 15/610,363

(22) Filed: May 31, 2017

(65) Prior Publication Data

US 2017/0346440 A1  Nov. 30, 2017

Related U.S. Application Data

(60) Provisional application No. 62/343,804, filed on May 31, 2016.

(51) Int. Cl.
| | | |
|---|---|---|
| H02G 3/10 | (2006.01) | |
| H02S 40/34 | (2014.01) | |
| H02S 30/10 | (2014.01) | |

(52) U.S. Cl.
CPC ............. *H02S 40/34* (2014.12); *H02S 30/10* (2014.12)

(58) Field of Classification Search
CPC . H02G 3/08; H02G 3/081; H02G 3/10; H02S 40/34; H02S 30/10; H02S 30/00; F16M 13/02; F16M 13/00; H05K 5/00; H05K 5/02; H01R 4/28; H01R 13/5202; H01R 4/30; H01R 4/42; H02B 1/46

USPC ....... 174/50, 520, 57, 535, 545, 559, 54, 58, 174/481, 503, 17 R, 480; 220/3.2, 3.3, 220/3.8, 4.02; 439/535; 248/949, 689, 248/682, 906, 200; 361/601, 679.01, 724

See application file for complete search history.

(56) References Cited

U.S. PATENT DOCUMENTS

| | | | | |
|---|---|---|---|---|
| 4,460,232 | A * | 7/1984 | Sotolongo | ................ H05K 7/12 439/535 |
| 6,344,612 | B1 * | 2/2002 | Kuwahara | .......... H01R 13/5202 174/50 |
| 7,435,897 | B2 | 10/2008 | Russell | |
| 7,574,842 | B2 | 8/2009 | Russell | |
| 8,003,885 | B2 * | 8/2011 | Richter | .................... H01R 4/28 174/50 |
| 8,109,048 | B2 | 2/2012 | West et al. | |
| 8,471,144 | B2 * | 6/2013 | Kleiss | ...................... H02G 3/08 174/50 |

(Continued)

FOREIGN PATENT DOCUMENTS

| | | |
|---|---|---|
| CN | 202839698 | 3/2013 |
| CN | 205178976 | 10/2014 |
| KR | 20120069890 | 6/2012 |

*Primary Examiner* — Angel R Estrada
(74) *Attorney, Agent, or Firm* — Lance C. Venable; Law Office of Lance C. Venable, PLLC

(57) ABSTRACT

In various representative aspects, an assembly for connecting and electrically bonding electronic equipment to solar panel frames is provided. The present invention relates generally to an assembly for supporting junction box structures used in a solar panel frame array. More specifically, the apparatus comprises an adjustable bracket assembly that can mount most sizes and shapes of junction boxes that are then secured virtually to any solar panel frame while being electrically bonded by way of a surface layer penetrating means.

21 Claims, 8 Drawing Sheets

(56) References Cited

U.S. PATENT DOCUMENTS

| | | |
|---|---|---|
| 8,690,110 B2 | 4/2014 | Shmukler et al. |
| 8,701,254 B2 | 4/2014 | Lin |
| 9,099,849 B2 | 8/2015 | Shmukler et al. |
| 9,337,771 B2 | 5/2016 | Guo |
| 9,748,897 B2 * | 8/2017 | Sella .................. H05K 5/02 |
| 2011/0114149 A1 | 5/2011 | Li |
| 2015/0381104 A1 | 12/2015 | Shmukler et al. |

* cited by examiner

BRACKET MOUNTING ASSEMBLY FOR SECURING JUNCTION BOXES TO SOLAR PANEL ARRAYS

BACKGROUND OF INVENTION

Field of the Invention

The present invention relates generally to an assembly for securing and installing electrical junction boxes for use with solar panel arrays that are typically installed on roof structures. More specifically, the assembly comprises a bracket assembly that supports an electrical junction box on one end, and is coupled to the frame of a solar panel module. When coupled to the solar panel frame, the bracket can also include an electrical bonding means to electrically bond the junction box to the solar panel frame. A method of installation is also disclosed.

Description of the Related Art

Any discussion of the prior art in the specification should in no way be considered as an admission that the prior art is widely known or forms part of common general knowledge in the field.

Installing a solar panel array on a roof can be challenging. One difficult aspect of the process is installing a junction box as part of the array so that the junction box has a low profile and requires only a minimum number of parts to complete the installation. A junction box typically provides an enclosed junction where wiring from different components in the solar panel array are combined and grounded.

There are several types of junction boxes that are typically used. They range in size from a 4"×4"×2" to a 12"×12"×6" size box and are made from various materials including PVC plastic and stainless steel.

There are several ways to install junction boxes as part of the solar panel array. First, the junction box can be installed using a roof-mounted structure as shown in FIG. 1. This structure affixes the box 100 with external cable conduit 110 flat on the roof structure 105 and uses screws or glue to secure the box to the roof structure 105. This is not ideal because it creates unwanted holes into the roof 105, which may create possible leak points. Furthermore, the box 100 is in plain sight on the roof making it unsightly and unappealing aesthetically.

A second variation of the junction box installation is a roof-mounted structure with a flashing 130 as shown in FIGS. 2 and 3. This assembly is similar to the first example, except that the box 100 is mounted directly to the flashing 130 or is incorporated with the flashing 130. This variation is limited to flash mounting and may require a proprietary box and proper flashing. It must be mounted directly to the roof 105 as well.

A third variation of the junction box installation is in the form of a rail mounted box that is mounted to a solar panel rail guide 140 as shown in FIG. 4. In this example, the solar panel rail guide 140 is typically mounted to the roof 105 by using a bracket 160 secured with a bolt 165. The junction box 150 is then coupled to the rail guide 140 using a bolt or similar connecting device. This design can only be installed on solar panel arrays that use rail guides to support the solar panel frames and typically requires extra hardware and brackets to complete the installation.

A fourth variation is a rail-less mount that is coupled directly to the frames on the solar panel array as shown in FIG. 5. The present invention falls under this category of structure. In this variation, the box 155 is secured to the solar panel frame 500 by using a pair of L-shaped brackets 170 that are affixed within a groove of the solar panel frame 500 with the box 155 secured to the extended portions 180 of the brackets 170. This design limits the installer to use only proprietary module frames with grooves or slots that match the linking hardware. A design that enables junction boxes to be secured to any solar panel frame is and is not limited to any shape or size of junction box. Additionally, a design that can be installed in a rail-less solar panel array to virtually any solar panel frame that is not limited to a particular design of frame is desired.

SUMMARY OF THE INVENTION

The invention is summarized below only for purposes of introducing embodiments of the invention. The ultimate scope of the invention is to be limited only to the claims that follow the specification.

It is an object of the present invention to provide a bracket mount assembly for securing electrical panels such as an electrical junction box to a solar panel frame.

It is a further object of the present invention to provide a bracket mount assembly that electrically bonds the junction box to the solar panel frame.

It is a further object of the present invention for the bracket comprise a clip for securing the bracket to the solar panel frame.

It is a further object of the present invention for the clip to comprise a raised portion such as a grounding pin to penetrate a surface oxidation layer of the solar panel frame in order to electrically connect the solar panel frame to the junction box.

It is a further object of the present invention for the clip to be adjustable to fit on varying sizes of solar panel frames.

It is a further object of the present invention to provide a method for securing the bracket to the solar panel frame.

It is a further object of the present invention to provide a method for securing the junction box to the bracket.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
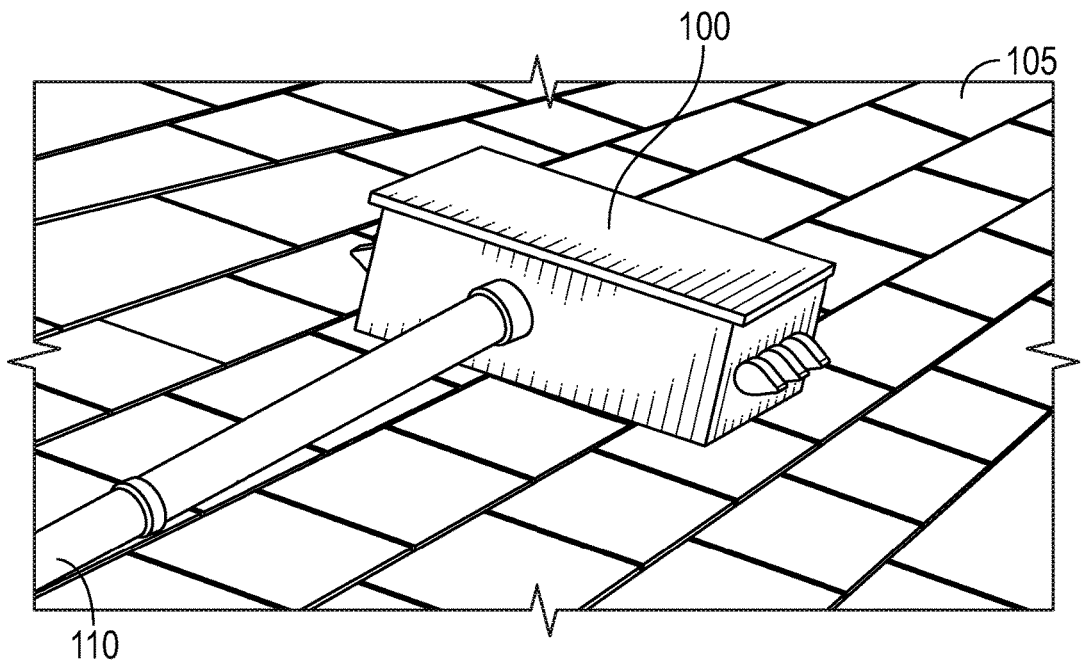
FIG. 1 illustrates a perspective view of a prior art junction box direct roof installation.
Figure 2:
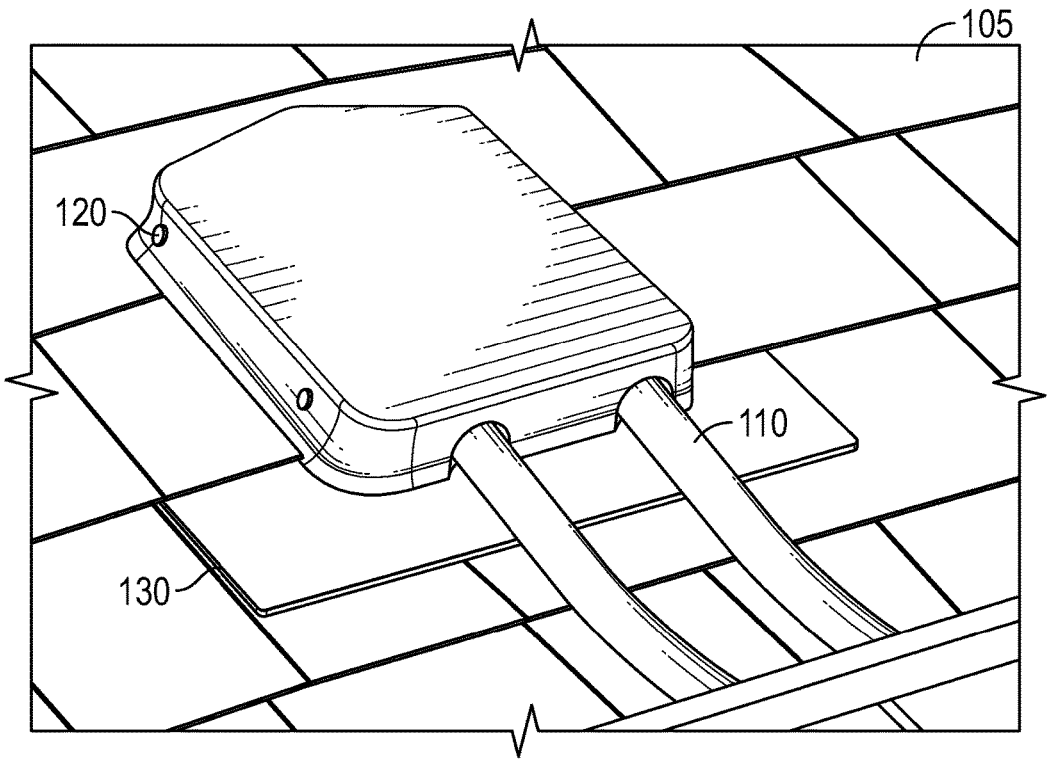
FIG. 2 illustrates a top perspective view of a junction box prior art installation that is secured to a roof with a flashing.
Figure 3:
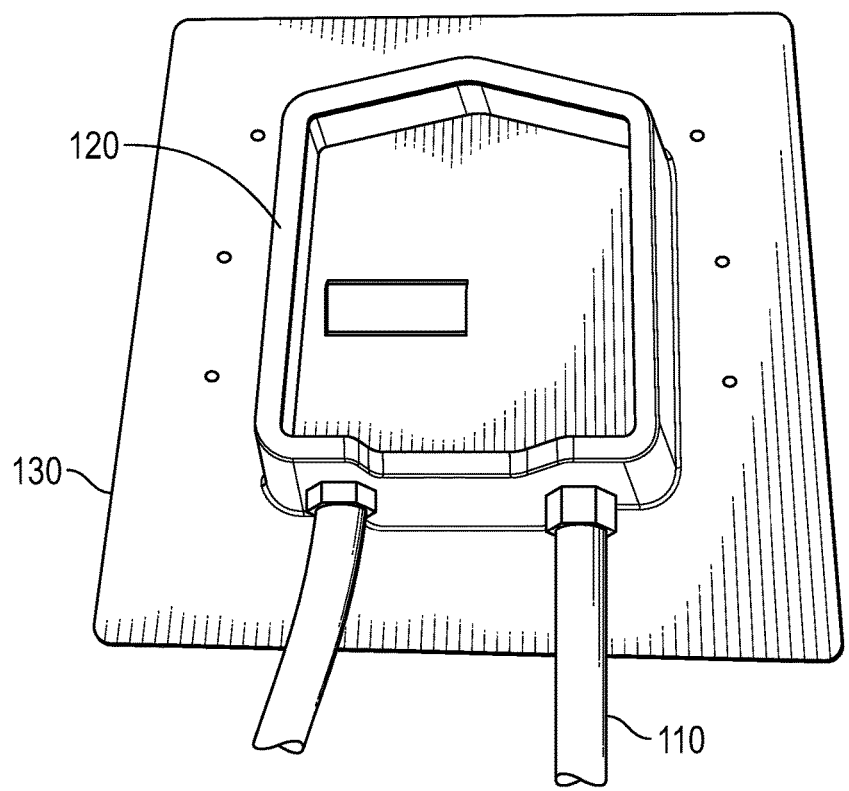
FIG. 3 is a perspective view of a variation of the junction box installation shown in FIG. 2 that uses a flashing.
Figure 4:
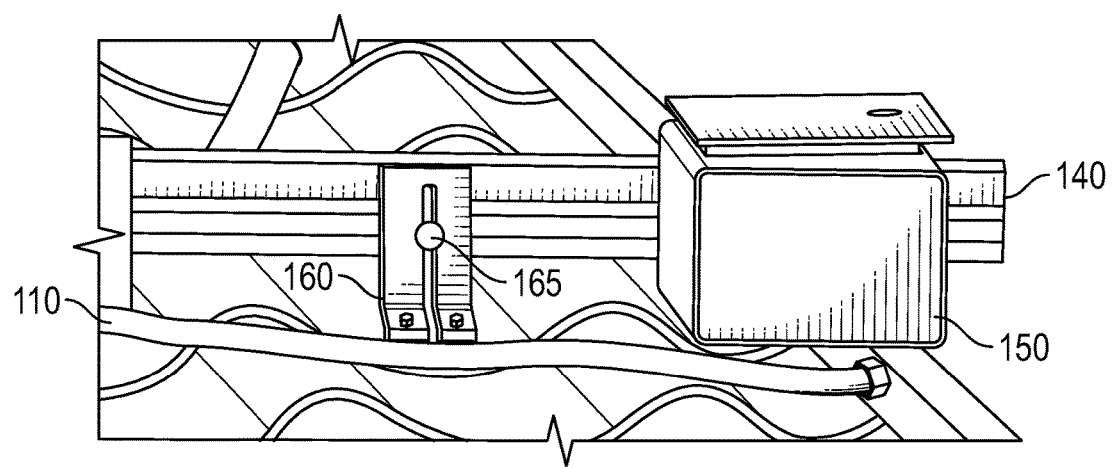
FIG. 4 illustrates a front view of a junction box prior art installation secured to a solar panel rail guide.
Figure 5:
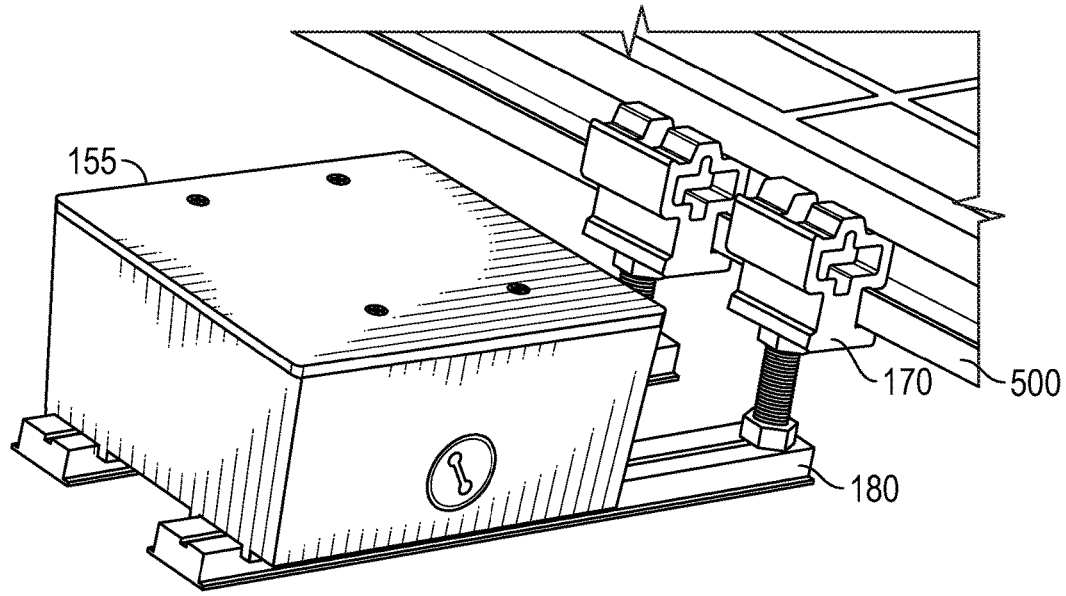
FIG. 5 illustrates a perspective view of a junction box prior art installation that is connected directly to a solar panel frame.
Figure 6:
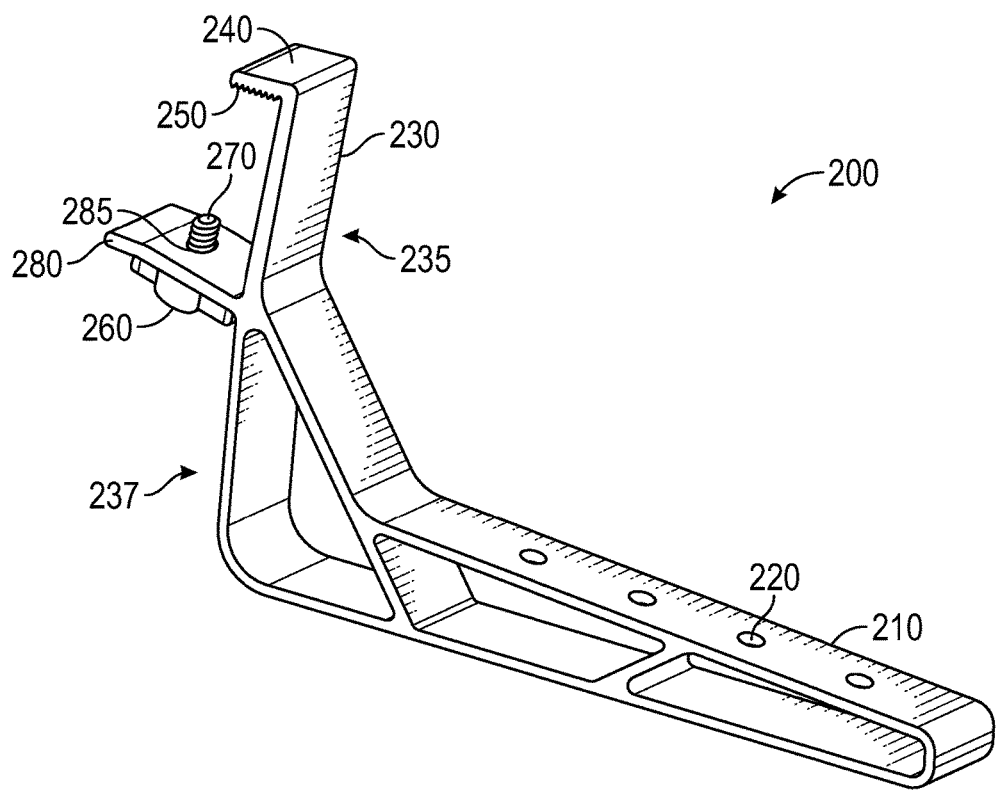
FIG. 6 illustrates a perspective view illustrating an exemplary junction box mounting bracket.
Figure 7:
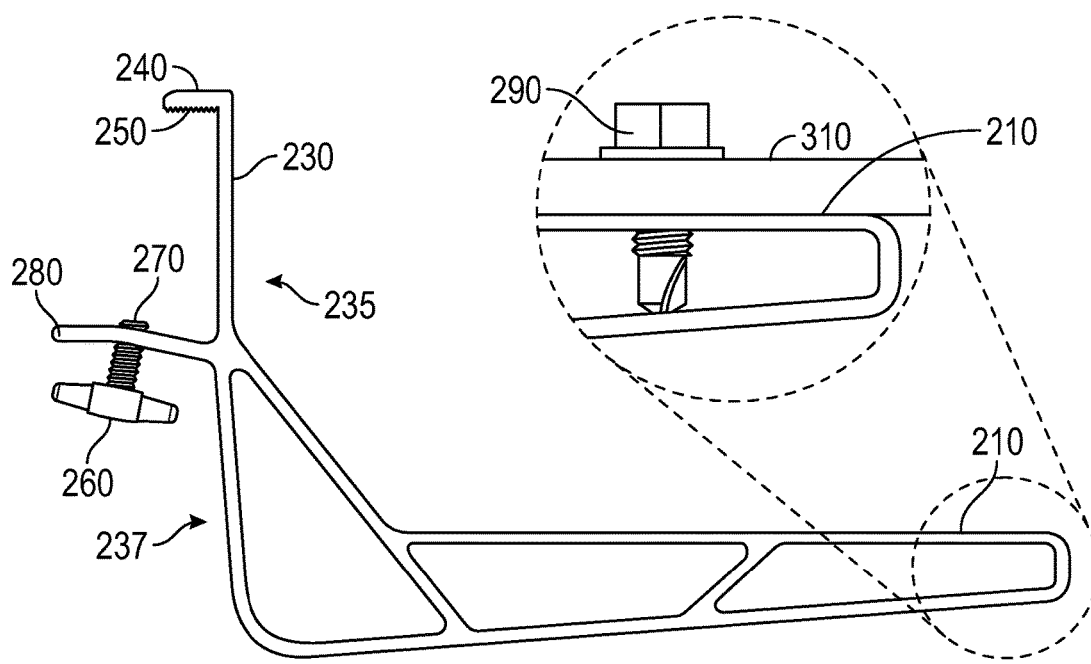
FIG. 7 illustrates a side view of the mounting bracket of FIG. 6 with an exploded view of an end of the bracket when it is secured to the junction box.
Figure 8:
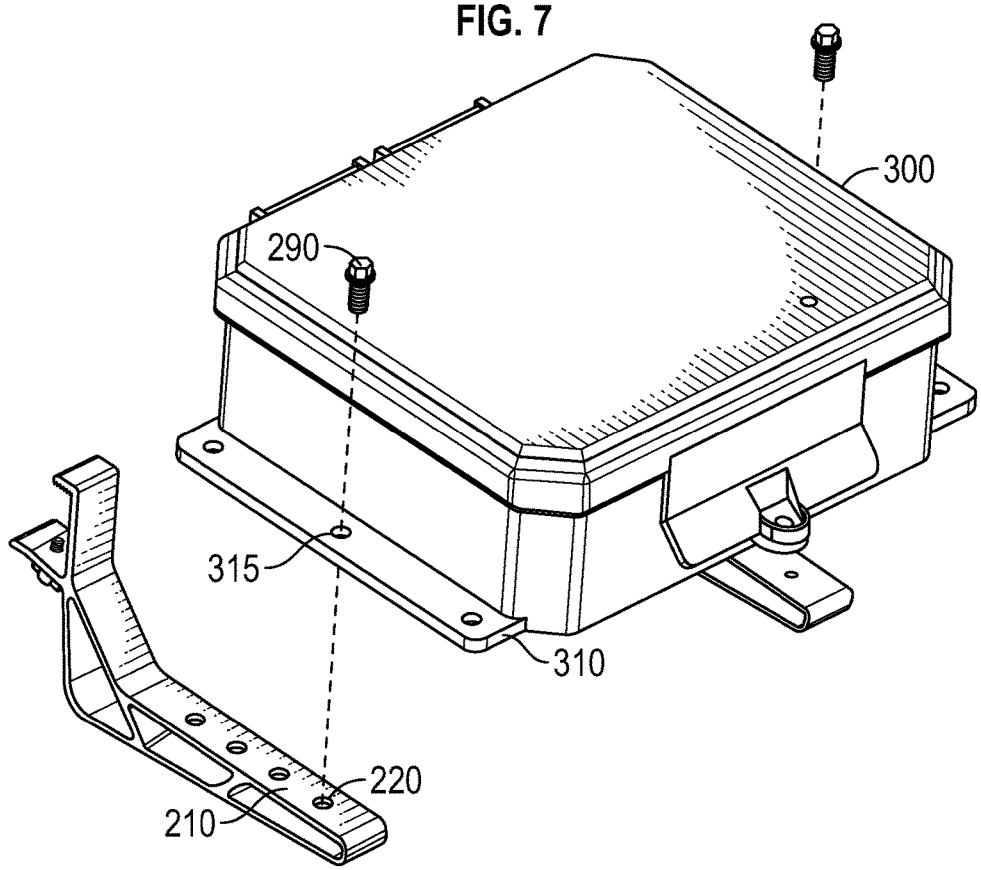
FIG. 8 illustrates a perspective exploded view of an exemplary junction box that is secured to the mounting bracket of FIG. 6.

FIG. 6 illustrates an exemplary junction box mount comprising a bracket 200 for use with a rail-less solar panel array system. The bracket 200 as generally L-shaped and includes a front side 210 and a rear side 237. The front side 210 includes several openings or pilot holes 220. Although one pilot hole would be sufficient, having several pilot holes 220 allows a junction box 300, as shown in FIG. 8, to be secured at various locations along the front side 210 of the bracket 200. The junction box 300 can be secured to the front side 210 of the bracket 200 with by using fasteners such as standard screws 290 as shown in FIG. 7, or slots can be used to interconnect the junction box 300 when necessary. The slots can also use self-driven screws. The advantage of a slot is that allows more location freedom. The bracket 200 can be manufactured in any suitable manner such as extruding it into a single piece. The bracket 200 is typically combined with a second identical bracket to properly secure a wide range of junction box sizes in place along a solar panel frame.

Figure 9:
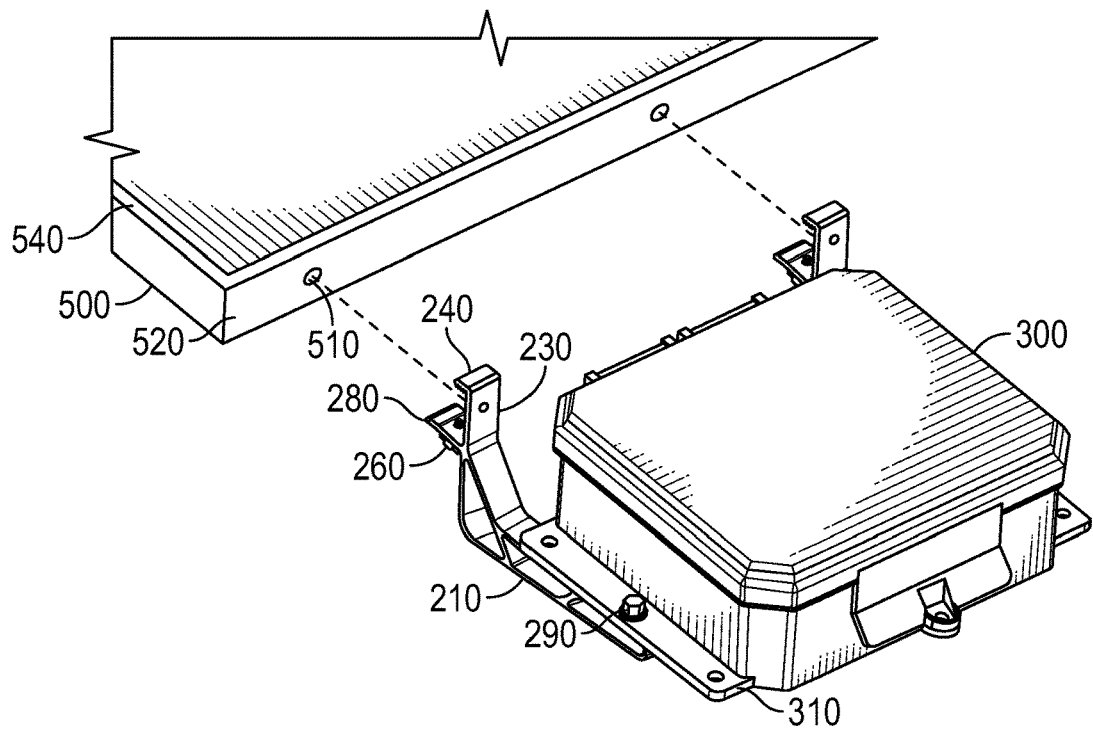
FIG. 9 illustrates a perspective view showing the exemplary junction box bracket secured to the junction box prior to being secured to a solar panel frame.
Figure 10:
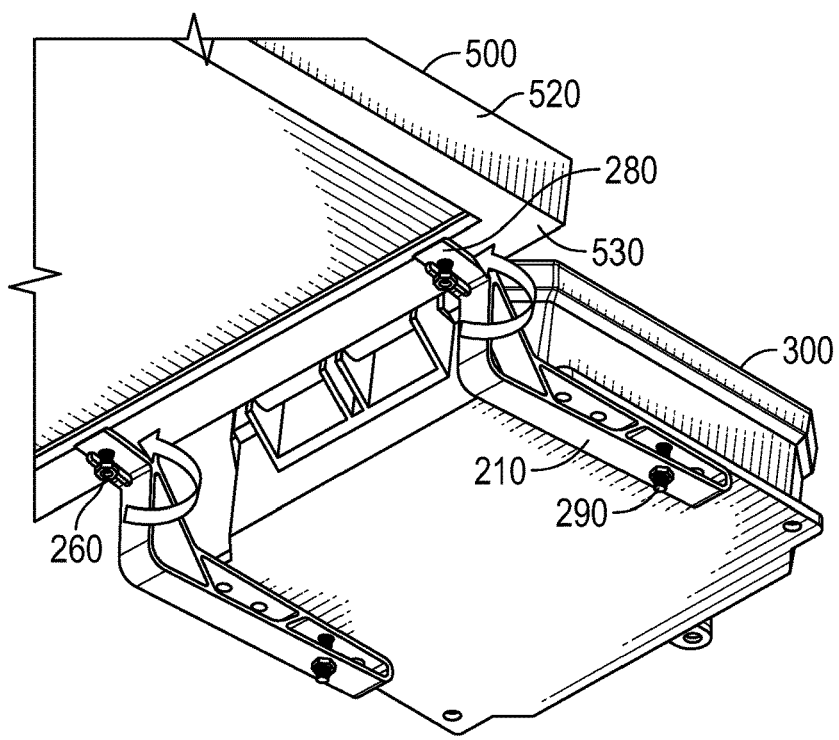
FIG. 10 illustrates a bottom perspective view of the mounting brackets secured to the solar panel frame with the junction box secured to the mounting brackets.

The rear side 237 of the bracket is better shown in FIG. 7. The rear side 237 in this exemplary embodiment illustrates a single-sized clip 235 that is adapted for a single-sized solar panel frame 500. The clip 235 includes a bottom panel 280, a rear panel 230, and a top panel 240. The bottom panel includes an opening 285. The opening 285 is typically threaded for receiving a fastener such as an adjustable screw 260, which in this embodiment is a standard thumb screw 260, with a threaded shank 270. The top panel includes at least one grip 250 and may also include a raised portion 255 that can penetrate a surface oxidation layer of a metal object. The thumb screw 260 is used to tighten the grip to the solar panel frame 500 as shown in FIG. 9. The thumb screw 260 also serves to electrically bond the bracket 200 to the solar panel frame 500 by penetrating the surface oxidation layer of the solar panel frame 500 when tightened. It is understood that other types of fasteners can be used to secure the clip 235 to the solar panel frame 500 that can penetrate a surface oxidation layer of a metal object. Also pictured is an example of a self-tapping screw 290 in the exploded view of the end of the bracket 200 that shows how the junction box 300 is secured to the bracket 200.

A typical junction box 300 is installed as shown using the following steps. First, the junction box is secured to the brackets 200 as shown in FIG. 8. The exemplary junction box 300 has a side mount 310 on each side of the box 300 with screw holes 315. The screws 290 are secured through the screw holes 315 and into at least one of the pilot holes 220 on the front side 210 of the bracket 200. It is understood by one of ordinary skill in the art that the junction box 300 can be secured to the brackets 200 by using similar fasteners to the screws 290 or by permanently affixing the junction box 300 with adhesive methods.

Once the junction box 300 is secured to the brackets 200, the brackets 200 are coupled to the solar panel frame 500 as shown in FIG. 9. A typical solar panel frame 500 has a top side 540, a front side 520 and a bottom side 530. Each of these sides form the outer sides of the solar panel frame 500. The clip 235 is inserted over the solar panel frame 500 so that the top panel 240 of the clip 235 contacts the top side 540 of the solar panel. Likewise, the rear panel 230 of the clip 235 contacts the front side 520 of the solar panel frame 500, and finally the bottom panel 280 of the clip 235 contacts the bottom side 530 of the solar panel frame 500.

Figure 11:
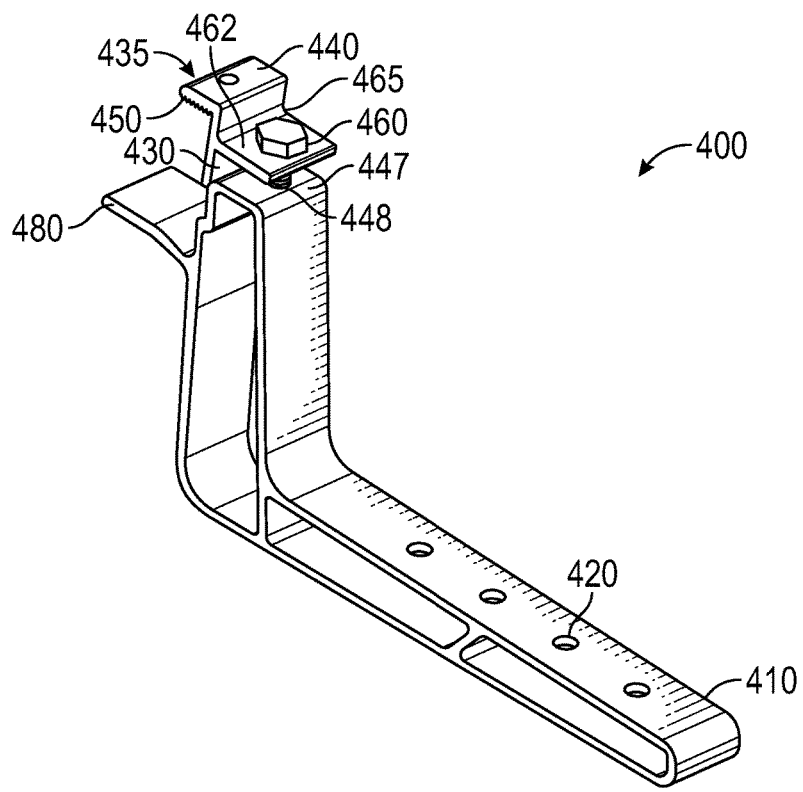
FIG. 11 illustrates an alternative exemplary embodiment of the junction box mounting bracket with an adjustable clamp.
Figure 12:
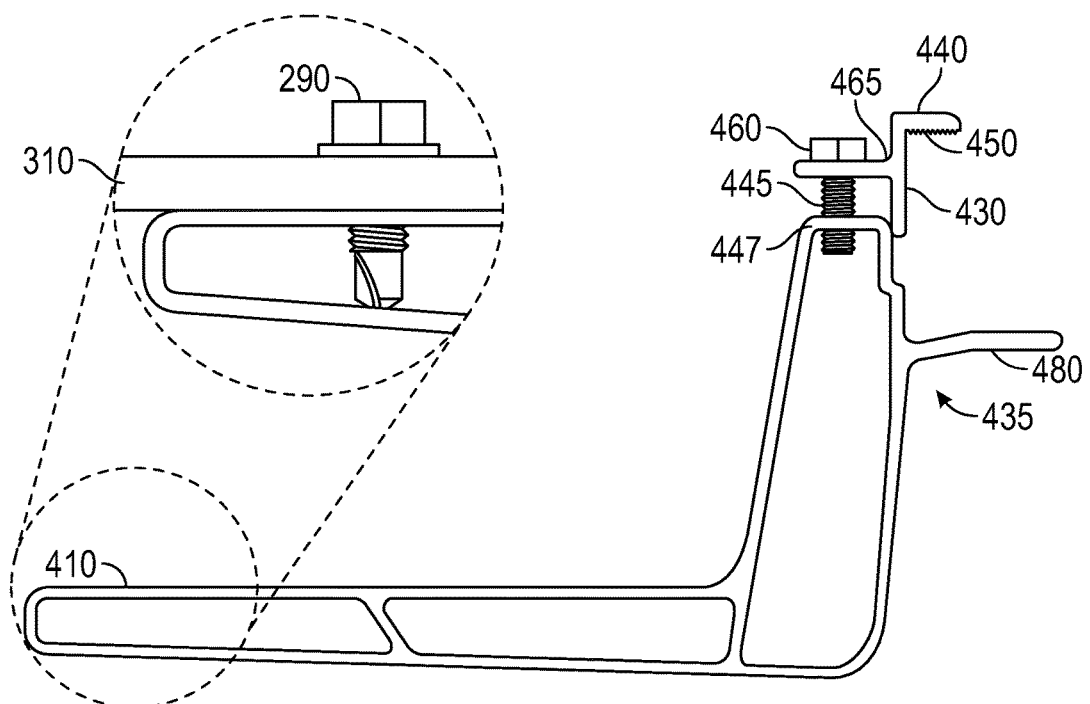
FIG. 12 illustrates a side view of the alternative exemplary mounting bracket of FIG. 11 with an exploded view of an end of the bracket when it is secured to the junction box.

FIGS. 11 and 12 illustrate an alternate exemplary embodiment showing the bracket 400. The bracket 400 includes an adjustable mounting clip 435 that allows the bracket 400 to be secured to solar panel frames with varying-sized edges. The clip 435 includes an adjustable portion 430 that comprises a top panel 440, a rear panel 465, and a fastener such as an adjustment screw 442 that includes a threaded shank 445. The clip 435 includes a bottom panel 480. The adjustable portion 430 includes an aperture 462 that may be threaded for receiving the threaded shank 445. The top of the bracket 447 also includes an aperture 448 that is typically threaded for receiving the threaded shank 445. The clip 435 is secured to the solar panel frame by way of adjustment screw 442 as shown and it is understood that other types of fasteners can be used to secure the clip 435. The adjustable clip 435 also includes a grounding pin 450 on the bottom surface of the top panel for penetrating the surface oxidation layer of the top side 540 of the solar panel frame 500 when the adjustment screw 442 is tightened downward. This enables the bracket 400 to create an electrical connecting path between the junction box 300 and the solar panel frame 500. An exploded view of one of the pilot holes is also shown in FIG. 12.

Figure 13:
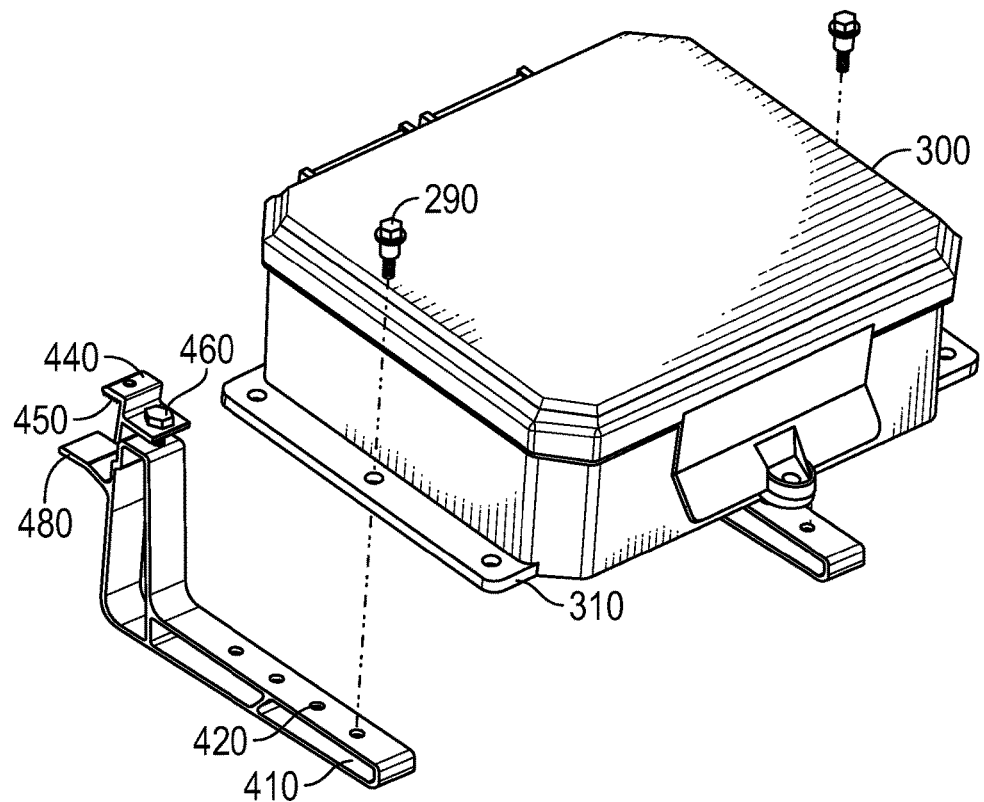
FIG. 13 illustrates a perspective exploded view of the junction box that is secured to the alternative exemplary mounting bracket of FIG. 11.
Figure 14:
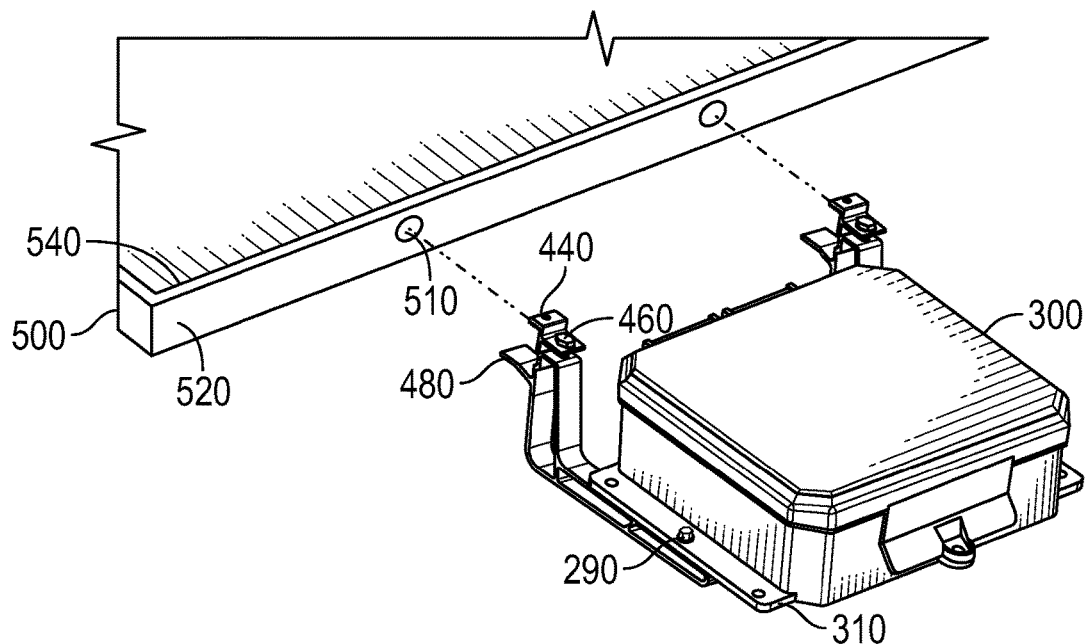
FIG. 14 illustrates a perspective view showing the alternative exemplary junction box mounting bracket secured to the junction box prior to being secured to a solar panel frame.

The bracket 400 is installed in a similar fashion as the first embodiment of the bracket 200. First, the junction box 300 is installed onto the brackets as shown in FIG. 13 such that the side mount 310 is secured to the front side 410 of the bracket 400 by tightening the screws 290 to the openings or pilot holes 420. Again, it is understood by one of ordinary skill in the art that the junction box 300 can be secured to the brackets 400 by using similar fasteners to the screws 290 or by permanently affixing the junction box 300 with adhesive methods. The clips 435 are then coupled to the solar panel frame 500 as shown in FIG. 14. The clip 435 is inserted over the solar panel frame 500 so that the top panel 440 of the clip 435 contacts the top side 540 of the solar panel. Likewise, the rear panel 430 of the clip 435 contacts the front side 520 of the solar panel frame 500, and finally the bottom panel 480 of the clip 435 contacts the bottom side 530 of the solar panel frame 500.

Figure 15:
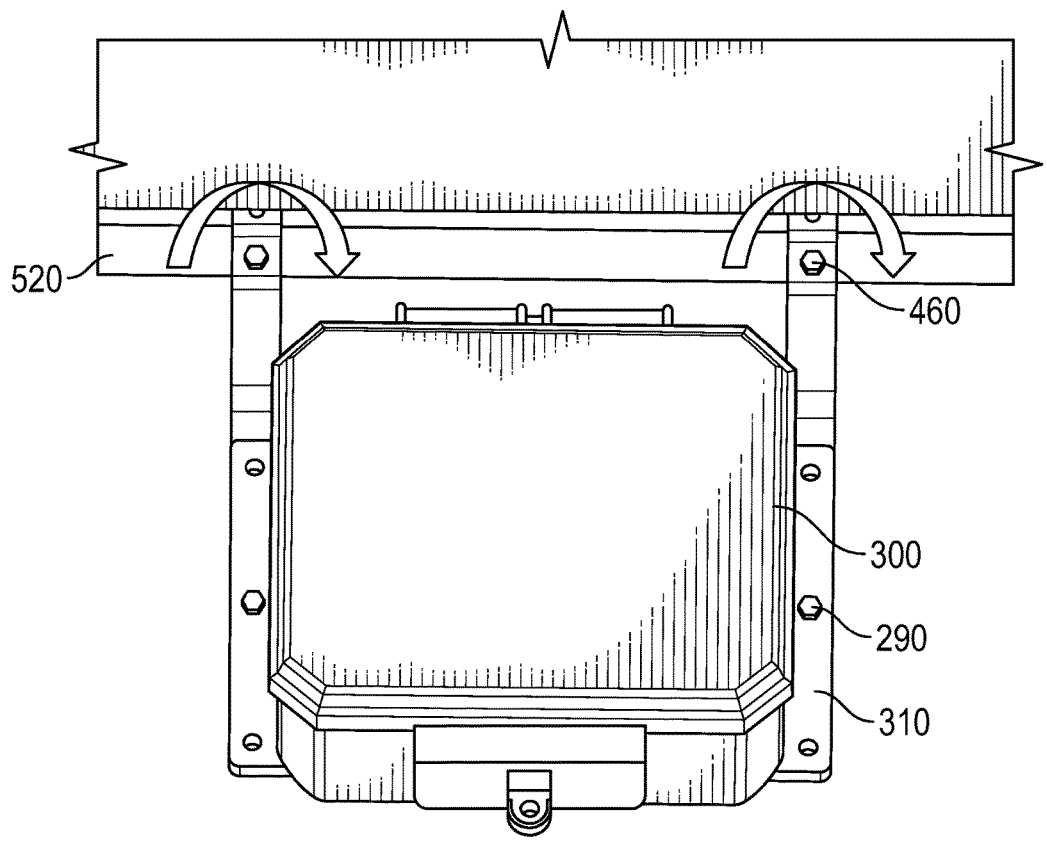
FIG. 15 illustrates a top perspective view of a fully installed pair of alternative exemplary mounting brackets secured to the solar panel frame.
Figure 16:
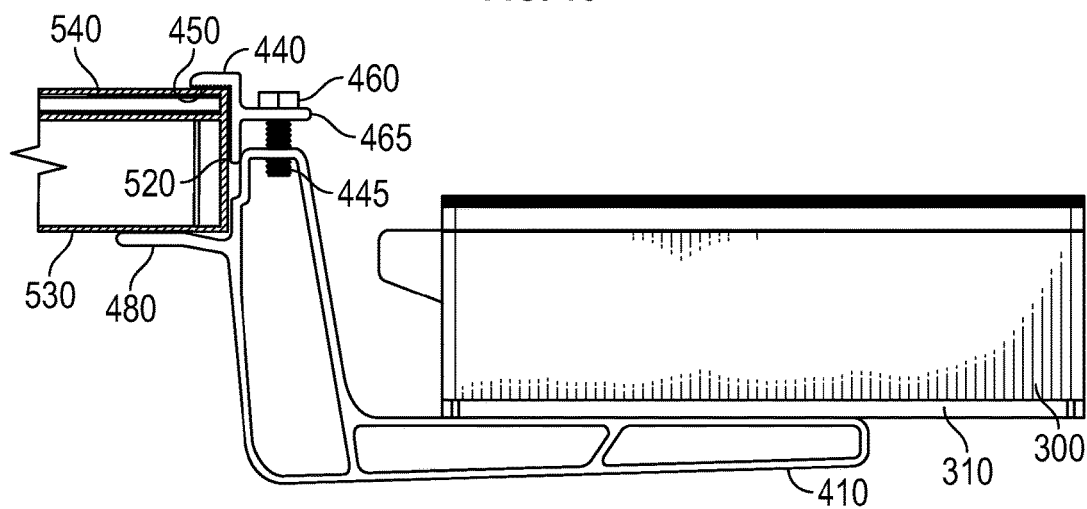
FIG. 16 illustrates a side view of FIG. 15.

Finally, once the clip 435 is in place the brackets 400 are then secured on to the panel 500 as shown in FIGS. 15 and 16. The adjustment screw 442 is then tightened so that the adjustable portion 430 is then lowered and pressed downward onto the top side 540 of the solar panel frame as shown below in FIG. 16. Once tightened, the grounding pin 450 penetrates the surface oxidation layer of the top side 540 of the solar panel frame 500 and creates an electrical grounding path between the junction box 300 and the solar panel frame 500. When the bracket 400 is installed, typically, enough clearance should be provided so that the top of the junction box 300 can be lifted at a 90-degree angle with respect to the solar panel frame 500.

What is claimed is:

1. A bracket mounting assembly for securing and electrically coupling an electrical panel to a solar panel frame comprising:
   a. a bracket; the bracket comprising:
      i. a rear side; the rear side comprising a clip, wherein the clip is configured to conform to the outer sides of the solar panel frame, the clip further comprising a fastener for securing the clip to the solar panel frame wherein the fastener is a screw; and
      ii. a front side extending outward from the rear side for supporting the electrical panel.

2. The assembly of claim 1 further comprising an electrical junction box wherein the electrical junction box is coupled to the front side of the bracket.

3. The assembly of claim 1 wherein the bracket is an L-shaped bracket.

4. The assembly of claim 1 wherein the front side further comprises at least one opening for securing the electrical panel to the front side.

5. The assembly of claim 1 wherein the bracket is an L-shaped bracket.

6. The assembly of claim 1 wherein the front side further comprises at least one opening for securing the electrical panel to the front side.

7. A bracket mounting assembly for securing and electrically coupling an electrical panel to a solar panel frame comprising:
   a. a bracket; the bracket comprising:
      i. a rear side; the rear side comprising:
         A. a bottom panel;
         B. a first aperture; and
      ii. an adjustable mounting clip, the adjustable mounting clip further comprising:
         A. a rear panel;
         B. a top panel wherein the top panel extends outward from the rear panel;
         C. an adjustable portion extending outward from the rear panel and is adjustably coupled to the rear side of the bracket; and
      iii. a front side extending outward from the rear side for supporting the electrical panel further comprising at least one opening for receiving a bolt.

8. The assembly of claim 7 wherein the adjustable portion further comprises:
   a. a second aperture; and
   b. a fastener such that the adjustable mounting clip is coupled to the rear side of the bracket by coupling the fastener between the first and second threaded apertures.

9. The assembly of claim 8 wherein the fastener is a screw.

10. The assembly of claim 7 wherein the bottom panel further comprises a grounding pin capable of penetrating a surface oxidation layer of a solar panel frame.

11. The assembly of claim 7 wherein the top panel further comprises a grounding pin capable of penetrating a surface oxidation layer of a solar panel frame.

12. The assembly of claim 7 further comprising an electrical junction box wherein the electrical junction box is coupled to the front side of the bracket.

13. The assembly of claim 7 wherein the bracket is an L-shaped bracket.

14. The assembly of claim 7 wherein the front side further comprises at least one opening for securing the electrical panel to the front side.

15. A method of securing and electrically coupling an electrical panel to a solar panel frame comprising the steps of:
   a. coupling a bracket to a solar panel frame such that the bracket comprises:
      i. a rear side; the rear side comprising:
         A. a bottom panel;
         B. a first aperture; and
      ii. an adjustable mounting clip, the adjustable mounting clip further comprising:
         A. a rear panel;
         B. a top panel further comprising a grounding pin, wherein the top panel extends outward from the rear panel;
         C. an adjustable portion extending outward from the rear panel and is adjustably coupled to the rear side of the bracket; and
      iii. a front side extending outward from the rear side for supporting the electrical panel;
   b. adjusting the height of the adjustable portion downward such that the grounding pin penetrates a surface oxidation layer of the solar panel frame; and
   c. securing the electrical panel to the front side of the bracket so that the electrical panel is electrically coupled to the bracket.

16. The method of claim 15 wherein the step of tightening the adjustable portion the bracket to the solar panel frame comprises the steps of:
   a. coupling a fastener through the first threaded aperture and a second threaded aperture on the adjustable portion.

17. The method of claim 15 wherein the electrical panel is an electrical junction box.

18. The method of claim 15 wherein the support bracket is an L-shaped support bracket.

19. The method of claim 16 wherein the fastener is an adjustment screw.

20. A bracket mounting assembly for securing and electrically coupling an electrical panel to a solar panel frame comprising:
- a. a bracket; the bracket comprising:
  - i. a rear side; the rear side comprising a clip, wherein the clip is configured to conform to the outer sides of the solar panel frame, the clip further comprising:
    - A. a fastener for securing the clip to the solar panel frame;
    - B. a rear panel;
    - C. a top panel extending outward from the rear panel; and
    - D. a bottom panel extending outward from the rear panel wherein the bottom panel further comprises a threaded aperture for receiving the fastener;
  - ii. a front side extending outward from the rear side for supporting the electrical panel.

21. The assembly of claim 20 further comprising an electrical junction box wherein the electrical junction box is coupled to the front side of the bracket.

* * * * *